United States Patent [19]

Lucy

[11] 4,131,498

[45] Dec. 26, 1978

[54] METALLIC SPONGE INCENDIARY COMPOSITIONS

[75] Inventor: Carl F. Lucy, Albany, Oreg.

[73] Assignee: Teledyne Industries, Inc., Albany, Oreg.

[21] Appl. No.: 872,167

[22] Filed: Jan. 25, 1978

[51] Int. Cl.² ............................................. C06B 45/00
[52] U.S. Cl. ...................................... 149/2; 149/19.3; 149/114
[58] Field of Search ........................... 149/2, 19.3, 114

[56] References Cited

U.S. PATENT DOCUMENTS

| 3,829,537 | 8/1974 | Rosenthal | 149/2 X |
| 3,959,041 | 5/1976 | Knapp | 149/2 |

Primary Examiner—Stephen J. Lechert, Jr.
Attorney, Agent, or Firm—Shoemaker and Mattare, Ltd.

[57] ABSTRACT

An incendiary composition comprising zirconium or hafnium metallic sponge particles and an organic binder. The metallic sponge particles are from 2.5 to 300 mesh U.S. Standard. The binder is present in an amount of from 2% to 15% by weight.

5 Claims, No Drawings

METALLIC SPONGE INCENDIARY COMPOSITIONS

BACKGROUND OF THE INVENTION

1. Field of the Invention:

This invention relates to incendiary compositions for producing incendiary components for munitions and other incendiary devices. More specifically, this invention relates to incendiary compositions produced from zirconium or hafnium sponge metal compacted in a binder. The binder is of an organic nature and can be any fluorocarbon polymeric material.

2. Description of the Prior Art:

Incendiary compositions are used for a wide variety of purposes, from propellant fuels to welding to munitions. Many munitions such as High Explosive Incendiary projectiles fired from guns, bombs guided or free fall, bomblets, grenades, kinetic energy projectiles and shaped charge warheads are designed to contain an incendiary material to ignite the combustible materials within the influence area of the munition. Many of the incendiary compositions incorporated into the design of these weapons contain low density metal powders such as aluminum or magnesium combined with a variety of oxidizer materials usually referred to as pyrotechnic compositions. Another incendiary material commonly used in many munitions is white phosphorus which has poor performance characteristics, is hazardous, difficult to load, and limited in its application to many munition designs.

Other compositions containing zirconium and titanium metal in organic binders have been known to be used in incendiary compositions. Examples of these are illustrated in several patents. For example, Patent 3565706 discloses an incendiary composition containing a fluorocarbon such as teflon and a metal powder such as zirconium, uranium, tantalum and vanadium. The composition disclosed in this patent is primarily for a fuel although it does state that it can be used for ordnance material. In this patent the fluorocarbon is present in a large amount and acts mainly as a binder. The metals are used in the form of fine powders of a size of from 1 to 300 microns. This composition has certain drawbacks when used as an incendiary composition in a fire bomb type ordnance material. Due to the fine size of the metal particles, the projection of these particles on impact is of a limited area because of the light weight of the particles.

Some other patents disclosing an incendiary composition containing a fluorocarbon as a binder and zirconium metal are Patents 3734788, 3876477 and 3753811. All of these patents disclose compositions containing large amounts of fluorocarbon and zirconium metal along with other compounds. The first two refer to propellants and are drawn to slow burning fuels while the latter is an igniter device for propellants, fuels and explosives. All of these compositions have the drawback associated with the use of metal particles wherein the size of said particles is of a very fine nature to give it its pyrotechnic quality.

Finally, there is the Griffin Patent 3927993 which discloses an incendiary composition for a fire starter which can be used in ordnance material as stated in the specification thereof. This reference discloses the use of zirconium, titanium and hafnium sponge metal compacted with a binder. It suggests various binders including some resinous compositions and a wide range of mesh size for the metallic sponge.

None of the above patents, however, disclose the use of zirconium or hafnium sponge in a fluorocarbon binder which, although encompassed under the Griffin Patent, does have certain unknown qualities particular to this specific combination.

BRIEF SUMMARY OF THE INVENTION

It is, accordingly, one object of the present invention to provide a new incendiary composition in which larger and heavier particles of metal can be used.

Another object of the present invention is to provide an incendiary composition wherein large particles of metallic sponge are used in a compact containing a fluorocarbon binder.

An additional object of the present invention is to produce an incendiary composition which can be used in a warhead designed to spread burning particles over wider areas than previous compositions.

A still further object of the present invention is to produce a new incendiary composition containing zirconium or hafnium sponge metal in a fluorocarbon binder and wherein the sponge metal is of the size from 2.5 to 300 mesh.

A further object of the present invention is to produce an incendiary composition containing zirconium or hafnium sponge in combination with a fluorocarbon wherein the fluorocarbon reacts with the zirconium sponge to help sustain burning once ignited.

Yet another object of the present invention is to produce an incendiary composition containing zirconium and hafnium sponge and polytetrafluoroethylene.

These and other advantages of the present invention will be apparent from the following description and examples.

In accordance with the above objects it has been found that larger and heavier metallic particles can be used in an incendiary composition containing these particles in an organic binder, by using sponge material. The use of zirconium or hafnium metallic sponge allows the weight of the particles in the composition to be heavier, thus being capable of being projected a greater distance upon impact. The quality which allows the use of these particles is the increase in surface area of the sponge particles over the ordinary metallic particles. Due to this increase in surface area, the sponge metal will have a shorter ignition time and once ignited will maintain its burning quality. The use of particles of this size of ordinary metal would produce compositions which would have such a high and slow ignition that they would not burn on impact.

Further it has been found that the use of teflon as a binder for the metallic sponge allows the composition to be compacted into very precise metallic shapes having close tolerances, physical strength and good surface finish.

Another advantage of the use of teflon is that it does react with the metal sponge to produce the tetrafluoride of the metal and helps sustain the combustion of the metal.

DESCRIPTION OF THE PREFERRED EMBODIMENTS

Tests of incendiary or fragmentation-incendiary munitions utilizing zirconium and hafnium metallic sponge particles have shown a dramatic increase in effectiveness over many of the low density metal pyrotechnic mixes. Further, the ability to compact or press zirconium and hafnium sponge with a suitable binder material into simple or complex geometric shapes allows the munition designer more flexibility in the development of more efficient munition design configurations.

This invention provides a method to manufacture incendiary components of simple or complex shapes, utilizing zirconium and hafnium metallic sponge particles and a binder material. Zirconium and hafnium metallic particles are, as their name implies, porous forms of these metals. The sponge particles do possess a fair degree of ductility and when introduced into a forming die and pressure applied, will through plastic deformation of the particles assume the shape of a simple die configuration. The shape and strength of a compacted part will vary in relation to the pressure applied, the ductility of the sponge and the sponge particle mesh size. This invention concerns itself with sponge particles ranging in mesh sizes from 2.5 mesh to 300 mesh, U. S. Standard. One of the desirable features of using the sponge form of these metals in an incendiary material is the fact that they are porous, giving each particle a high surface area to mass ratio. Each of these metals is pyrophoric and when ignited by whatever means, the high surface area to mass ratio enhances the burning reliability of each particle. If compacted at too high a pressure, the volume-to-mass ratio is proportionally reduced, thus proportionally reducing the surface area-to-mass ration and in turn affecting the burn characteristics of the manufactured part. In some cases this can be an undesirable feature. To overcome this problem a binder material is mixed or blended with the loose sponge particles before the pressing or compacting operation is performed. The binder material when blended with the sponge particles allows the mixture to be compacted into whatever shape is desired at a much lower pressure, thus preserving the porous nature of the sponge particles. A binder material which lends itself well to this process is powdered polytetrafluoroethylene, preferably within a particle size of 100 micron to 500 micron which has been used successfully in this application. Other fluorocarbon resins, fibers and powders can also be used.

In many applications the compacted incendiary component is imbeded or cast into the explosive charge. It is therefore important that the binder material be chemically compatible with the explosive material and lend itself to the explosive loading process whether the casting or pressing method is used. In applications where compacted incendiary components are being used in conjunction with the explosive casting process, it is important that the binder material withstand the temperature (approximately 180° F.) of the melted explosive material. We have found that Teflon has this ability.

Examples of fluoroalkylene polymers contemplated for use in the invention, other than the preferred polyfluoroethylene and perfluoropropylene (commercially available as "Teflon 100"), chlorotrifluoroethylene homopolymers (commerically available as "Kel-F wax"), or copolymers such as with vinylidene fluoride (commercially available as "Kel-F elastomer"), homopolymers of perfluoropropylene and copolymers such as with vinylidene fluoride (commercially available as "Viton A", "Viton A-HV" and "Fluorel") and equivalent homopolymers and copolymers. Mixtures of two or more such polymers may be used as the polymer oxidizer-binder for the pyrotechnic.

With regard to the metallic sponge material used, it is an intermediate product in the production of the pure metal from its ore. For example, with regard to zirconium metal, it is produced from zircon (zirconium silicate, $ZrSiO_4$) and baddeleyite (zirconium oxide, $ZrO_2$). The zircon is commonly recovered from certain kinds of beach sands. The well-known Kroll process is used to refine zirconium. In this process zircon is converted to zirconium oxide by liquid extraction. Then zirconium oxide is converted to zirconium chloride ($ZrCl_4$) which is then reduced by molten magnesium to produce zirconium sponge. The sponge is then melted in a consumable vacuum arc furnace to recover the zirconium metal.

Although the present invention contemplates zirconium and hafnium, the description and examples refer to the preferred metal zirconium and therefore this has been emphasized over hafnium.

The following examples are noted to further illustrate the embodiments of the invention.

TABLE I

| No. | Zirconium Mesh Sizes | % | Teflon Micron Size | % | Compacting Pressure PSI | Pellet Size Inches | Static Ignition Test | Explosive Ignition Test | Test Results |
|---|---|---|---|---|---|---|---|---|---|
| 1 | − ½ + 6 | 70 | 400 | 30 | 10,000 | ½" OD × ½" | Yes | Yes | Static Ignition Test 50% reliability / Explosive Ignition Test 0% reliability |
| 2 | − ½ + 6 | 85 | 400 | 15 | 12,000 | ½" OD × ½" | Yes | Yes | Static Ignition Test 80% reliability / Explosive Ignition Test 30% reliability |
| 3 | − ½ + 6 | 90 | 400 | 10 | 12,000 | ½" OD × ½" | Yes | Yes | Static Ignition Test 80% reliability / Explosive Ignition Test 50% reliability |
| 4 | − 6 + 10 | 70 | 400 | 30 | 12,000 | ½" OD × ½" | Yes | No | Static Ignition Test 90% reliability |
| 5 | − 6 + 10 | 85 | 400 | 15 | 12,000 | ½" OD × ½" | Yes | No | Static Ignition Test 100% reliability |
| 6 | − 6 + 10 | 90 | 400 | 10 | 12,000 | ½" OD × ½" | Yes | Yes | Static Ignition Test 100% reliability / Explosive Ignition Test 85% reliability |
| 7 | − 10 + 20 | 70 | 400 | 30 | 12,000 | ½" OD × ½" | Yes | No | Static Ignition Test 100% reliability |
| 8 | − 10 + 20 | 85 | 400 | 15 | 12,000 | ½" OD × ½" | Yes | No | Static Ignition Test 100% reliability |
| 9 | − 10 + 20 | 90 | 400 | 10 | 12,000 | ½" OD × ½" | Yes | Yes | Static Ignition Test 100% reliability / Explosive Ignition Test 100% reliability |
| 10 | − ½ + 6 | 70 | 200 | 30 | 12,000 | ½" OD × ½" | Yes | Yes | Static Ignition Test 65% reliability / Explosive Ignition Test 15% reliability |
| 11 | − ½ + 6 | 85 | 200 | 15 | 12,000 | ½" OD × ½" | Yes | No | Static Ignition Test 100% reliability |
| 12 | − ½ + 6 | 90 | 200 | 10 | 12,000 | ½" OD × ½" | Yes | Yes | Static Ignition Test 100% reliability / Explosive Ignition Test 100% reliability |
| 13 | − 6 + 10 | 70 | 200 | 30 | 12,000 | ½" OD × ½" | Yes | Yes | Static Ignition Test 80% reliability / Explosive Ignition Test 100% reliability |
| 14 | − 6 + 10 | 85 | 200 | 15 | 12,000 | ½" OD × ½" | Yes | No | Static Ignition Test 100% reliability |
| 15 | − 6 + 10 | 90 | 200 | 10 | 12,000 | ½" OD × ½" | Yes | Yes | Static Ignition Test 100% reliability / Explosive Ignition Test 100% reliability |
| 16 | − 10 + 20 | 70 | 200 | 30 | 12,000 | ½" OD × ½" | Yes | Yes | Static Ignition Test 100% reliability / Explosive Ignition Test 100% reliability |

TABLE I-continued

| No. | Zirconium Mesh Sizes | % | Teflon Micron Size | % | Compacting Pressure PSI | Pellet Size Inches | Static Ignition Test | Explosive Ignition Test | Test Results |
|---|---|---|---|---|---|---|---|---|---|
| 17 | − 10 + 20 | 85 | 200 | 15 | 12,000 | ¼" OD × ¼" | Yes | No | Static Ignition Test 100% reliability |
| 18 | − 10 + 20 | 90 | 200 | 10 | 12,000 | ¼" OD × ¼" | Yes | Yes | Static Ignition Test 100% reliability<br>Explosive Ignition Test 100% reliability |
| 19 | ¼ + 6 | 70 | 100 | 30 | 10,000 | ¼" OD × ¼" | Yes | Yes | Static Ignition Test 75% reliability<br>Explosive Ignition Test 50% reliability |
| 20 | ¼ + 6 | 85 | 100 | 15 | 10,000 | ¼" OD × ¼" | Yes | No | Static Ignition Test 100% reliability |
| 21 | ¼ + 6 | 90 | 100 | 10 | 10,000 | ¼" OD × ¼" | Yes | Yes | Static Ignition Test 100% reliability<br>Explosive Ignition Test 100% reliability |
| 22 | − 6 + 10 | 90 | 100 | 10 | 9,000 | ¼" OD × ¼" | No | Yes | Explosive Ignition Test 100% reliability |
| 23 | − 6 + 10 | 95 | 100 | 5 | 9,000 | ¼" OD × ¼" | No | Yes | Explosive Ignition Test 100% reliability |
| 24 | − 10 + 20 | 90 | 100 | 10 | 9,000 | ¼" OD × ¼" | No | Yes | Explosive Ignition Test 100% reliability |
| 25 | − 10 + 20 | 95 | 100 | 5 | 9,000 | ¼" OD × ¼" | No | Yes | Explosive Ignition Test 100% reliability |
| 26 | − 6 + 10 | 98 | 100 | 2 | 9,000 | ¼" OD × ¼" | Yes | Yes | Static Ignition Test 100% reliability<br>Explosive Ignition Test 100% reliability |
| 27 | − 6 + 10 | 98 | 100 | 2 | 12,000 | ¼" OD × ¼" | Yes | Yes | Static Ignition Test 100% reliability<br>Explosive Ignition Test 100% reliability |
| 28 | − 6 + 10 | 98 | 100 | 2 | 15,000 | ¼" OD × ¼" | Yes | Yes | Static Ignition Test 100% reliability<br>Explosive Ignition Test 100% reliability |

In Table I the Static Ignition Test referred to is performed by placing the pellet on a heat insulated support and subsequently exposing it to a propane torch of a particular temperature and for a particular time. This time and temperature is that which causes a pure zirconium sponge pellet to ignite and burn 100%. The pellets are measured against this standard and the percent of pellets that burn is that which is set forth in the table as Percent Reliability. Therefore, as can be seen in Example 1, a 50% reliability indicates that one-half of the pellets have burned under these conditions of temperature and time.

In the Explosive Ignition Test this percentage of burn is reported in the table as Percentage Reliability in like manner to the Static Ignition Test.

As previously stated the detailed description relates solely to tests made on zirconium compact; however, hafnium has similar properties to the zirconium and therefore would have similar results.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the mete and bounds of the claims or that form their functional as well as conjointly cooperative equivalent are, therefore, intended to be embraced by those claims.

CLAIM

I claim:

1. An incendiary composition comprising teflon and a metal sponge selected from the group consisting of zirconium and hafnium.

2. The composition of claim 1. wherein the teflon acts as a binder and is present in an amount from 2 to 15% by weight.

3. Composition of claim 1. wherein the metal sponge has a mesh size of from 2.5 to 300 mesh.

4. The composition of claim 1. wherein the metallic sponge is present in the amount of 85 to 98% by weight.

5. A method of making an ordnance material comprising incorporating therein the composition of claim 1.

* * * * *